United States Patent

Thompson et al.

[15] 3,671,943

[45] June 20, 1972

[54] NUMBERS SYMBOLOGY

[72] Inventors: Harold W. Thompson, Pasadena; Harry W. Smith, West Covina; Paul A. McCann, Jr., Temple City, all of Calif.

[73] Assignee: said Thompson, by said Smith and McCann

[22] Filed: Aug. 31, 1970

[21] Appl. No.: 68,236

Related U.S. Application Data

[63] Continuation-in-part of Ser. No. 680,544, Nov. 3, 1967, abandoned.

[52] U.S. Cl. ....................340/172.5, 340/347

[51] Int. Cl. ....................G06f 5/00

[58] Field of Search ....................340/172.5, 347, 324 R, 173

[56] References Cited

UNITED STATES PATENTS

| | | | |
|---|---|---|---|
| 3,400,388 | 9/1968 | Blank | 340/347 X |
| 3,289,198 | 11/1966 | Dickson | 340/324 R |
| 3,396,378 | 8/1968 | Keith | 340/324 R |
| 3,351,928 | 11/1967 | Smola | 340/324 R |
| 3,365,714 | 1/1968 | Timares | 340/347 |
| 3,445,824 | 5/1969 | Fulenwider | 340/173 |
| 3,505,672 | 4/1970 | Chisholm | 340/347 |
| 3,509,563 | 4/1970 | Boggs | 340/347 |
| 3,566,391 | 2/1971 | Lally | 340/324 R X |
| 3,573,790 | 4/1971 | Schulenburg | 340/324 R X |

*Primary Examiner*—Paul J. Henon
*Assistant Examiner*—Ronald F. Chapuran
*Attorney*—Victor C. Muller

[57] ABSTRACT

A graphic presentation of numbers in binary coded basimal form in such fashion that the binary encoding of each basimal digit forms a distinctive symbol easily recognizable to the human being as a number. It is also easily entered into a register by automatic means.

11 Claims, 13 Drawing Figures

INVENTOR.

BY HAROLD W THOMPSON
HARRY W SMITH
PAUL A MC CANN

INVENTOR.
BY HAROLD W THOMPSON
HARRY W SMITH
PAUL A MC CANN

INVENTOR.
HAROLD W THOMPSON
HARRY W SMITH
PAUL A MC CANN

BY VICTOR C. MULLER, ATTY.

NUMBERS SYMBOLOGY

The application is a continuation-in-part of application serial No. 680,544, now abandoned filed November 3, 1967.

BACKGROUND OF THE INVENTION

In the prior art, arbitrary symbols, known as "Arabic numerals" are employed to designate the value of the individual coefficients, or digits, of a number expressed in implied exponential form employing any radix greater than two, the number 10 being most often employed. While satisfactory for human communication, Arabic numerals are ill suited to the requirements of automatic data handling means. Firstly, the presentation to an operator of the value of a number which may be stored in a register requires employment of an intricate and expensive display device to form the arbitrary Arabic symbol. Secondly, the entry into a register by automatic means of a number which may be recorded in graphic form requires, again due to the arbitrary form of the Arabic symbol, means so intricate, expensive, and unreliable that such art is impractical.

SUMMARY OF THE INVENTION

This invention is an improvement on the prior art in that the symbols employed to designate the value of the digits of a number expressed in implied exponential form bear a definite and simple relationship to one of those encodings by which numbers may be represented in a register, said encoding being known as binary coded basimal, so that the presentation by display means of a number which may be stored in a register in binary coded basimal form, and the entry into a register of a number which may be graphically recorded, become simple and straightforward procedures.

The invention contemplates the graphic presentation of numbers in binary coded basimal form in such fashion that the binary encoding of each basimal digit form a distinctive symbol easily recognizable as a number. "Binary coded basimal" will be understood to be that form in which the several digits of a number, the number being expressed in implied exponential form employing some number greater than 2 as radix, are themselves expressed in implied exponential form employing as radix the number two. The manner of presenting the binary digits will differ from the usual fashion of presenting a sequence of two valued signs in two significant respects. Firstly, that information conveyed by the position of a binary digit, the information being the power of the radix with which the binary digit is to be associated will now be conveyed by the shape of a geometric form, there being provided in any particular embodiment of the invention as many differently shaped forms as binary digits required to encode the several basimal numbers. Secondly, all those geometric shapes comprising the encoding of one basimal digit will be presented in a single array, there being provided one such array for each basimal digit. The particular geometric forms will be so devised that the plurality of forms comprising the binary encoding of a basimal digit form a distinctive pattern, easily recognizable as a numeral.

The invention also contemplates the automatic reading of a symbol or a plurality of symbols, such as by electronically scanning same, and storing the information in a suitable register. Conversely, the stored information may be transformed to a printed symbol or one which is otherwise recognizable, such as an electrically illuminated symbol.

BRIEF DESCRIPTION OF THE DRAWING

Many of the attendant advantages of this invention will be readily appreciated as the same becomes better understood by reference to the following detailed description when considered in connection with the accompanying drawings wherein.

DESCRIPTION OF THE PREFERRED EMBODIMENT

A particular embodiment of the invention, being a representation of the decimal digits in binary coded decimal form, employing geometric forms to present the binary encoding of the decimal digits, will be described in more detail, reference being made to the annexed drawings.

Figure 1:
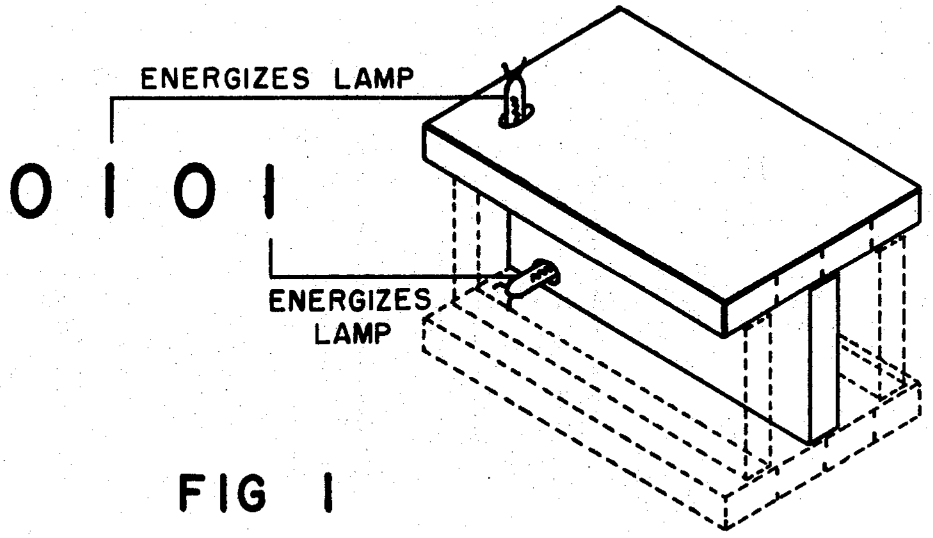
FIG. 1 illustrates an example of a binary coded basimal number as it would appear in a register and its transformation to the new geometric symbol.

Referring now to FIG. 1, the several binary digits depicted will be presented in a display device by means known and used in the art, an example of suitable means being the illumination of the lines comprising each form by suitably shaped light pipes, each of the light pipes being themselves illuminated by electric lamps, such lamps being energized or not, accordingly as the value of the digit associated with each lamp takes the value 1, or 0. Thus a four bit binary number 0 1 0 1, equivalent to five in binary coded decimal, is transformed into a number five in our new symbology.

Figure 2:
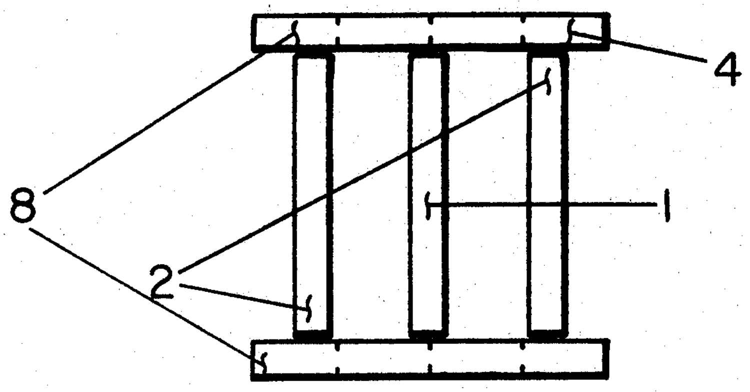
FIG. 2 is a front view of the geometric array which by choice of illumination is capable of forming all numerical symbols from 0 through 9.

Referring now to FIG. 2, the geometric form delineated comprises in itself the binary coded decimal representation of each of the decimal digits from one through nine. The numerical patterns are shown in the New Numerals column of FIG. 3.

Referring still to FIG. 2, the symbol corresponding to the Arabic numeral "0", being composed of the geometric representations of the binary numbers 10 and 1000, may not be displayed by the means hereinbefore described, but will require for its presentation additional parallel and independent means comprising logical circuitry arranged to display numerals 10 and 1000 whenever the register contains the number 0, such means being known and used in the art.

Figure 3:
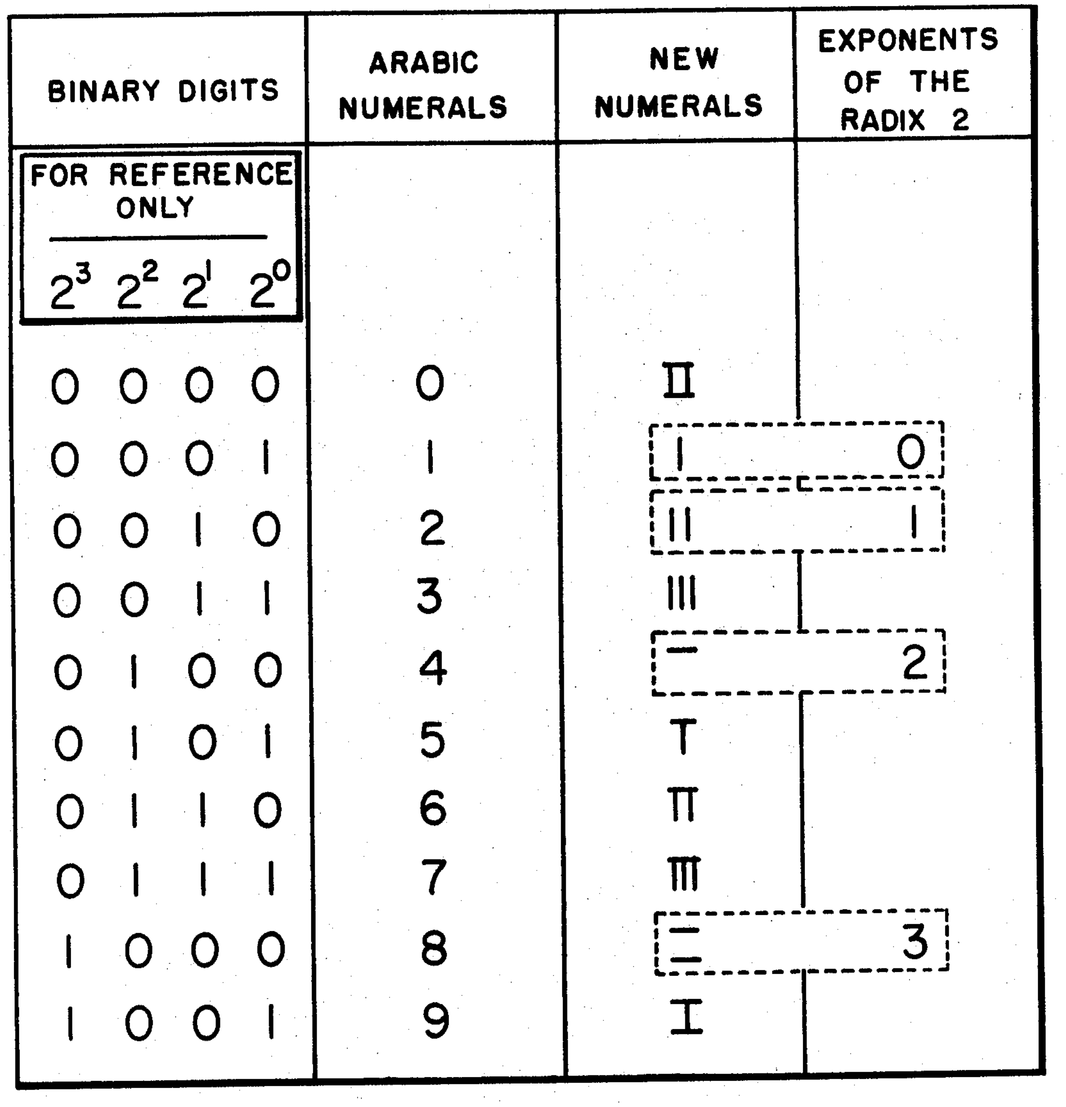
FIG. 3 is a table which shows binary digits, Arabic numerals, new numerals and exponents of the radix 2 as related in this invention.

Referring now to FIG. 3 in greater detail, under the heading Binary Digits are four columns presenting four place binary numbers. The fifth column is the equivalent of the binary numbers expressed in Arabic numerals. The sixth column replaces the Arabic numerals with our new numerical symbology. The seventh and last column shows the unique association of the exponents of the radix 2 with the geometric form to its left.

The manner of reading binary coded decimal (BCD) numbers recorded in the fashion herein disclosed by automatic means so that the value of a graphically recorded number may be entered into a register contemplates the scanning of each binary coded decimal symbol in sensibly horizontal and vertical directions and counting the number of lines crossed during the scan, this means being known and used in the art. The binary coded decimal value of each digit so scanned will be uniquely related to the value of the count so obtained and may be directly entered into a register configured to store numbers in binary coded decimal form by assigning the value 1 to each horizontal count, and the value 4 to each vertical count.

Scan Reading

Figures 4, 4A, 4B:
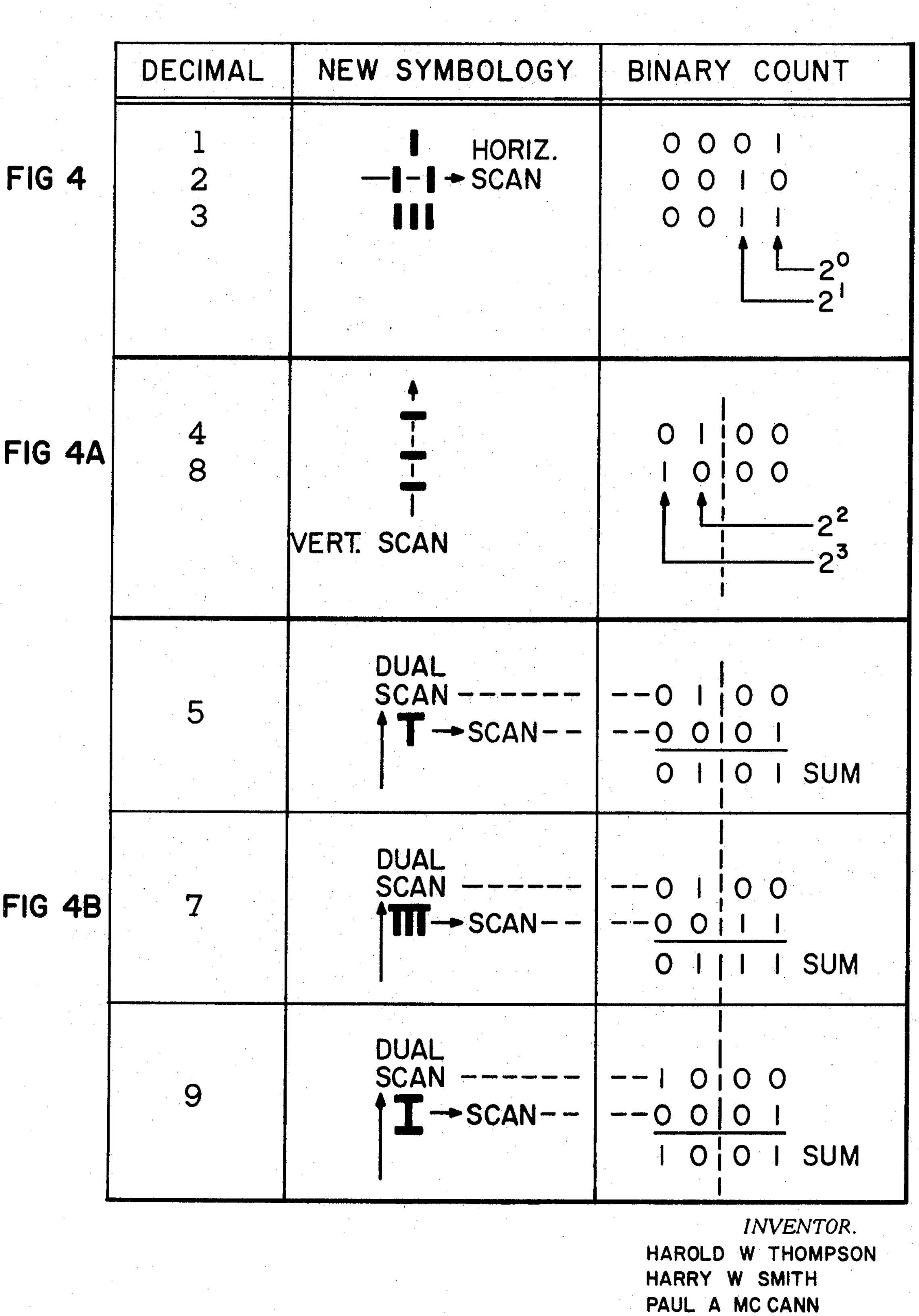
FIGS. 4, 4A and 4B illustrate binary scanning counts of the symbology.

In reading and interpreting this symbology, the two lowest powers of 2 may be recognized by scanning horizontally and counting vertical marks as illustrated in FIG. 4. Similarly, the two higher powers of 2 may be recognized by vertical scanning as illustrated in FIG. 4A. The results of the horizontal and vertical scan counts may be combined in proper place value by simple addition in proper place value to form the BCD equivalent to be used by the fluidic or electronic equipment which is to process the information as illustrated in FIG. 4B. The place holder character "0" is a special case since it would scan and combine to form a binary ten, which is not a valid BCD character. The circuitry in the scanner therefore must provide special detection logic to handle zeros properly.

Optical Character Recognition of the New Symbology

Figure 5:
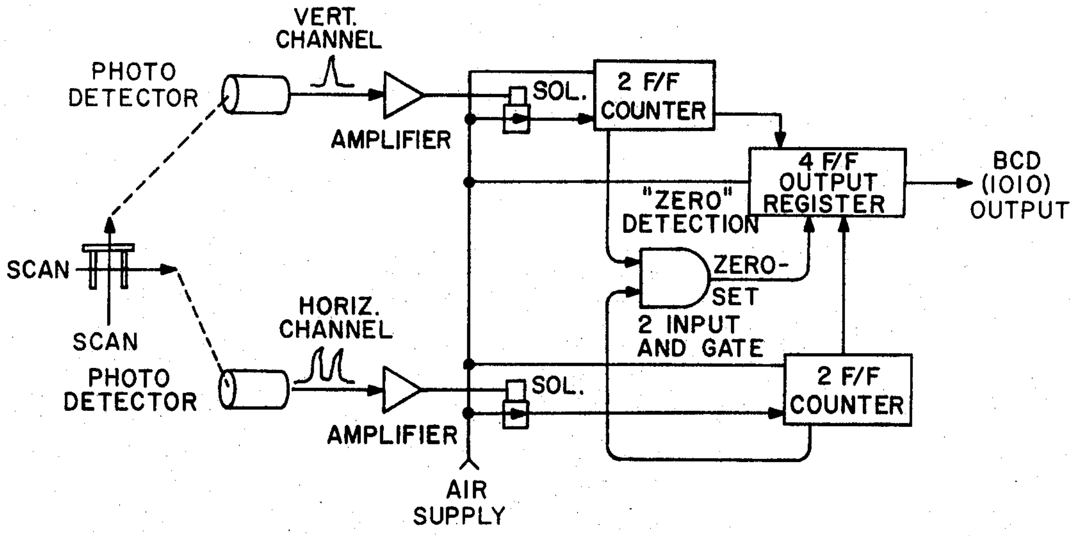
FIG. 5 illustrates a scanning technique and storage of information in a counter.

There are many methods of scanning material for information content, such as flying spot optical scanning or television scanning techniques. For purposes of a simplified explanation, consider a flying spot scanning device containing two individual scanners — one scanning horizontally and the other vertically. FIG. 5 illustrates the combined functional electronic and fluidic logic required to interpret the new symbology character being scanned by this method. As the vertical scanner senses the horizontal bar of the new graphic symbol (such as the symbol $\pi$ ), a pulse is generated by the vertical channel photo detector and is amplified sufficiently to drive a solenoid air valve which drives a two flip-flop binary counter. The same procedure applies to the horizontal scanner. A four flip-flop output register accepts the count information, with the vertical scan channel count being shifted into the two most significant output register flip-flops, and the horizontal scan channel count being shifted into the two least significant flip-flops. For the special case of a "zero" being scanned, a simple two input AND gate function detector may be used to detect "ones" in the most significant flip-flops of the two channel counters (indicating the binary number 1010). An output from this detector will assure that all zeros are placed in the output register. The simplicity of the readout mechanisms associated with this new symbology will also be apparent. In general, the end result of any data processing are groups of 4 binary bits which when translated become the desired decimal numerals.

Figure 6:
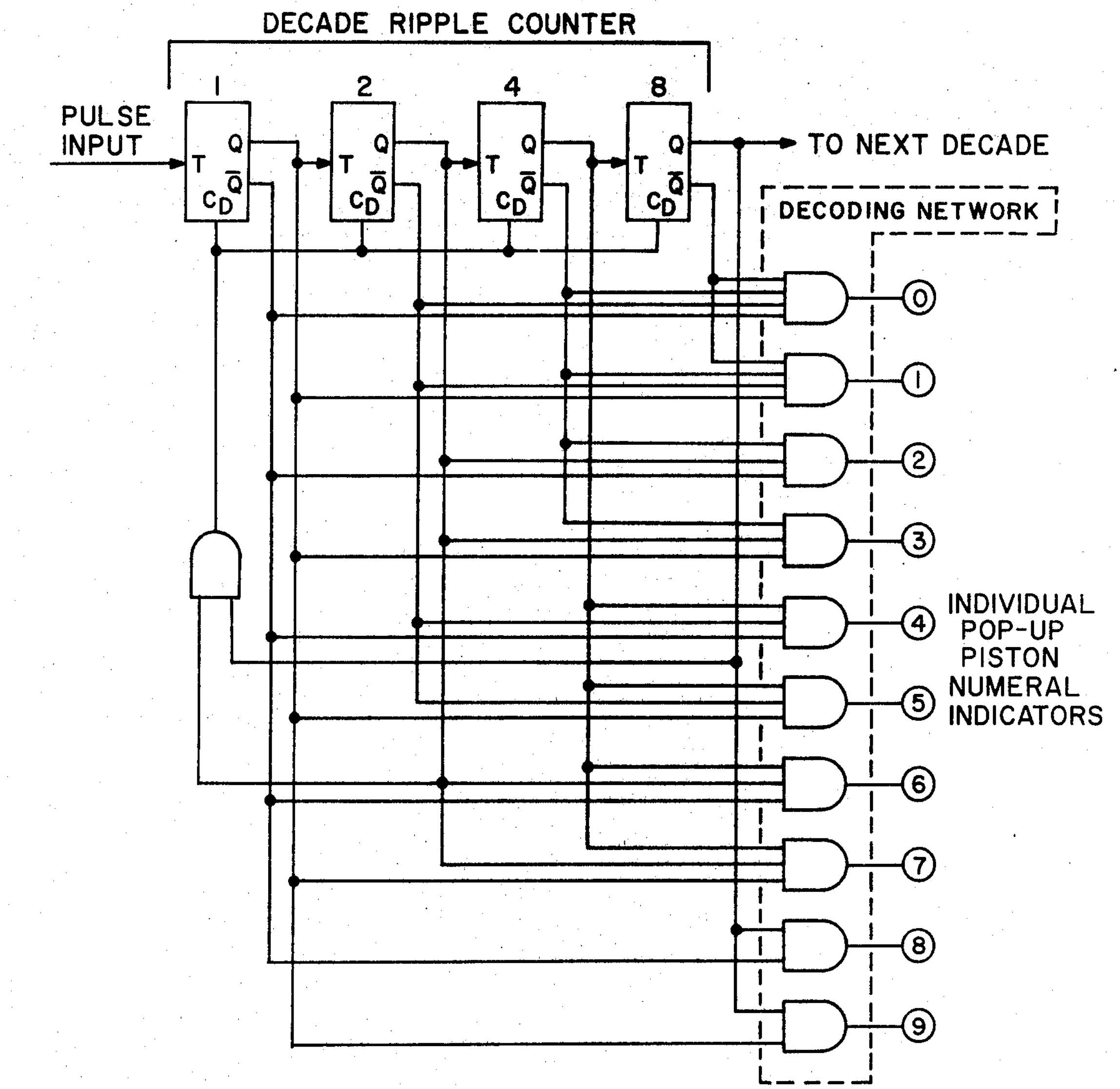
FIG. 6 illustrates a conventional system for decoding binary bits into decimal symbols.
Figure 7:
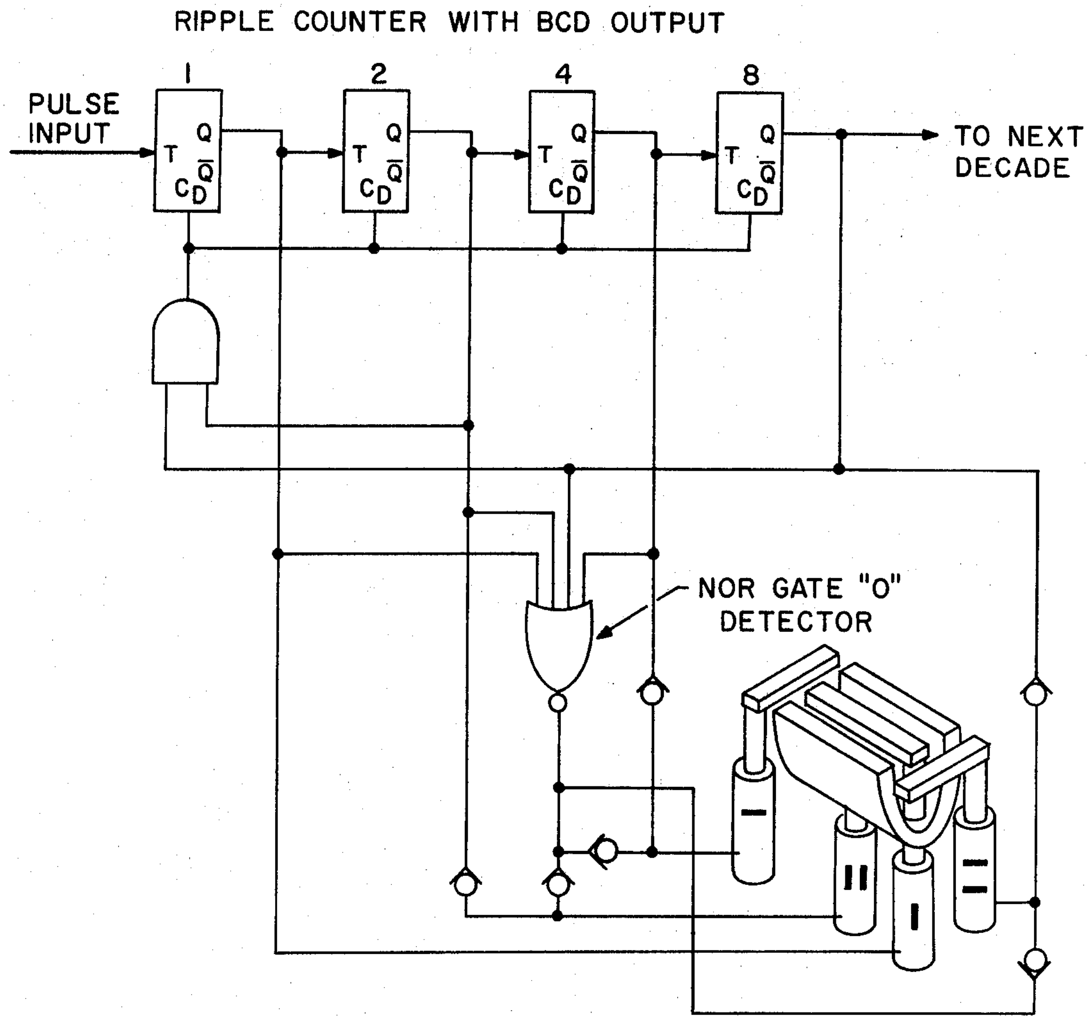
FIG. 7 illustrates a manner of transforming stored bits into tangible symbology, such as printing of same.
Figure 8:
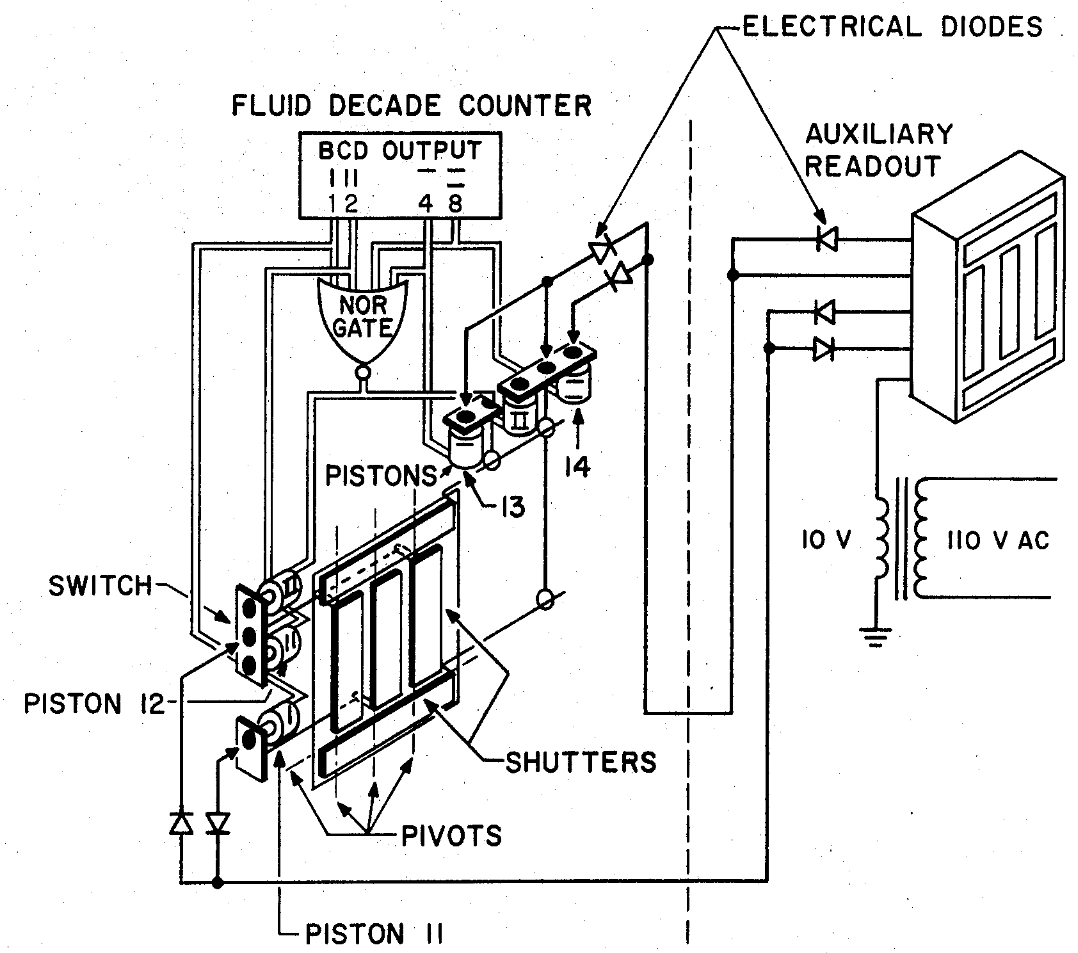
FIG. 8 illustrates a fluidic adaptation of the symbology.

Shown in FIG. 6 is a widely used system to decode the binary bits into decimal symbols. FIG. 7 shows how the bits stored in a (decade) ripple counter are used to form the new symbols and the simplification which results. FIG. 8 illustrates the fluidic adaptation of this new symbology.

Fluidic Device (FIG. 8)

This device is made with five shutters so arranged that when a combination, such as 4 and 2, are opened a picture corresponding to the new graphic symbols appears. The four bits of BCD pressure information contained in a register are applied to pistons which open the shutters. Piston 11 operates the central vertical shutter; piston 12 operates both vertical shutters simultaneously either side of the center; piston 13 operates the top horizontal shutter through a 'mechanical OR gate'; piston 14 operates the lower horizontal shutter and the top horizontal shutter through a 'mechanical OR gate'.

"0" is created with the use of a pneumatic NOR gate with the output being applied to two pistons which parallel the operations of pistons 12 and 14. Electrical contacts may be attached to the pistons to supply power for an auxiliary remote lamp illuminated readout, if desired.

While not illustrated, but as will be apparent, a cluster of pistons may drive bars rather than shutters which will print the new symbols on tapes or cards. Printing speed will be greatly improved over prior methods since printing decimal characters requires a drum containing ten symbols to be rotated to a correct position before a number may be struck and printed.

Auxiliary Lamp Readout

Figure 9:
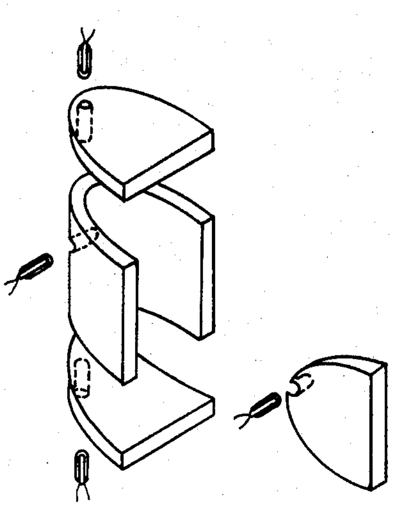
FIG. 9 is an exploded view of an illuminated readout.

Frequently it is desirable to carry readout information to remote areas. This is easily and inexpensively done electrically. FIG. 9 is an exploded view of readouts. The four lamps used are the grain of wheat variety which operate on 12 volts at 30 milliamperes. Referring to FIG. 8, contacts are provided on the pneumatic pistons which make when a number is displayed, repeating electrically the binary bits driving the mechanical display and illuminating lamps corresponding to the shutters. The use of seven inexpensive diodes in the AC system reduces the wiring required to two wires per decade plus a common ground.

Another purpose which may be served by a combination of fluidic switches actuating the electric switches and readouts is the capability of gaining an inexpensive memory. Rather than driving the electrical lamps directly, the current from the piston contacts may be applied to the gates of four silicon controlled rectifiers (SCR's ) which will cause the electrical readout to illuminate. In order for the lamps and SCR combination to function properly, two things are necessary. First, when the readout is being used to display periodically updated information, pulsating D.C. must be the source power for the lamp. Second, if for some reason, for example, loss of air pressure for the fluidic logic, it is desirable to hold in memory the last update; simultaneously, constant D.C. power must become the source power for the lamps and the source power for the SCR gates must be removed. Now, the last update will be displayed until the machine is reprogrammed. A last refinement may include a solenoid air switch (four per decade) which may tie in parallel with the decade readout lamps and on command reset the fluidic register, thus eliminating one of the more catastrophic problems encountered with fluidic logic.

The Case of Zero

Figure 10:
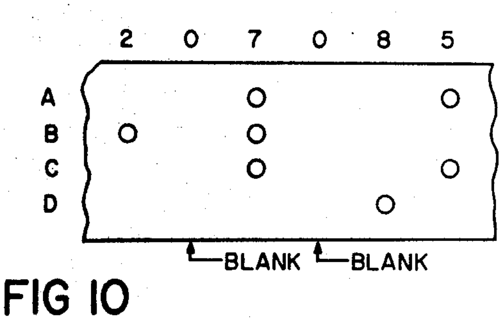
FIG. 10 and **19*a*** illustrate punched tapes.
Figure 10A:
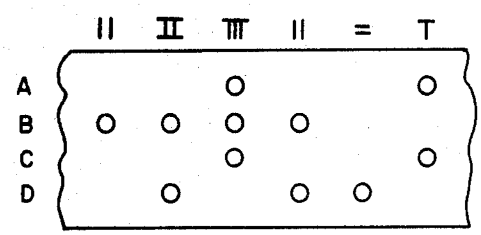

Previously, the case of "0" was mentioned. Although zero is equated to nothing, its importance in mathematics is apparent. In this new symbology, it serves several purposes outside of the obvious place-holding function. In general, the problem is how to identify nothing. In a simple tape-punch situation strictly concerned with translating a decade count to perforations in a tape, the number 207085 translated to tape would look like FIG. 10. Normally this situation does not exist because other codes are used with the added translation expense to arrive at the other codes. However, when the number is coded in this symbology, the tape would look like FIG. 10 . The tape generated for FIG. 10 invites error since the blank areas are nebulous. They may mean either a space or "0". The other tape, FIG. 10A, is marked for all digits thus eliminating confusion.

Uniquely "0" exists when one of two binary situations arises, expressed in Boolean Algebra, namely, $\bar{D}\bar{C}\bar{B}\bar{A}$ or $D\bar{C}B\bar{A}$ when applied to this new symbology. As shown in FIG. 8 a decade ripple counter uses a "N O R" gate to detect binary 0 0 0 0 and operates the readout. However, if the tape, FIG. 10A, were used to operate a numeric printing machine, the binary 1 0 1 0 would cause the digit $\pi$ to be printed, thereby eliminating the need for a NOR gate.

What is claimed is:

1. Electrical apparatus for representing or decoding numerical values comprising:

a. a plurality of elongated bar-like members which are subject to electric scanning or visual observation to determine the geometric forms of various combinations of same, b. three of said members being of like configuration and disposed in substantially parallel spaced relationship in a row, and c. fourth and fifth like members disposed in substantially parallel spaced relationship, substantially perpendicular to said three members, d. certain of said members being selectively usable, or usable in combination, to produce the various geometric forms, e. the construction and arrangement being such that said three members may be added, analogous to Roman numerical symbology, to represent numerical values 1, 2 and 3, said fourth and fifth members each representing the numerical value 4, the values 5, 6 and 7 being represented by one of said fourth and fifth members in combination with one or more of said three members, added as aforesaid.

2. Apparatus in accordance with claim 1 wherein the numerical value 9 is represented by the fourth and fifth members and one of said three members, and the numerical value 0 is represented by the fourth and fifth members and at least two of said three members.

3. Apparatus in accordance with claim 1 wherein said fourth and fifth members are disposed, respectively, adjacent opposite ends of said three members.

4. Apparatus in accordance with claim 3 wherein said fourth and fifth members are spaced outwardly from the ends of said three members.

5. Apparatus in accordance with claim 1 including means for selectively energizing all of said members to render same subject to visual observation or electric scanning, to thereby recognize the geometric forms produced thereby.

6. Apparatus in accordance with claim 5 wherein said members are energized by light sources.

7. Apparatus in accordance with claim 5 wherein said three members are subject to scanning in one direction and assigning the value 1 to each member scanned, and said fourth and fifth members are subject to scanning in a transverse direction and assigning the value 4 to each of same scanned.

8. A method of representing numerical values comprising the steps of:

a. forming a plurality of geometric patterns from combinations of five elongated bar-like numerical representations,
b. three of said representations being formed of like configuration and disposed in substantially parallel spaced relationship in a row,
c. the fourth and fifth of said representations also being of like configuration and disposed in substantially parallel relationship, substantially perpendicular to said three representations,
d. assigning the value 1 to each of said three representations and the value 4 to each of said fourth and fifth representations,
e. selecting a combination of said representations to form various geometric patterns which represent various numerical values, dependent upon the additive values of the representations selected, and
f. the further steps of scanning each of the geometric patterns in two directions, each in a direction transverse to the bar-like representations, forming a plurality of additive binary counts for an output register.

9. A method in accordance with claim 8 including the further step of transforming the binary counts in the output register to said geometric patterns.

10. Apparatus for reading a plurality of geometric patterns, each comprising a plurality of elongated bar-like representations which are subject to electric scanning or visual observation to determine the geometric forms of various combinations of same, three of said representations being of like configuration and disposed in substantially parallel spaced relationship in a row, and fourth and fifth like representations disposed in substantially parallel spaced relationship, substantially perpendicular to said three representations, certain of said representations being selectively usable, or usable in combination, to produce the various geometric forms, the construction and arrangement being such that said three representations may be added, analogous to Roman numerical symbology, to represent numerical values 1, 2 and 3, said fourth and fifth members each representing the numerical value 4, the values 5, 6 and 7 being represented by one of said fourth and fifth members in combination with one or more of said three representations, added as aforesaid, said apparatus comprising;

a. means for scanning each of the patterns in two directions, each in a direction transverse to the bar-like representations, and
b. an output register for receiving the scan in additive binary counts.

11. A system for representing and decoding a plurality of different geometric patterns;

a. each pattern being disposed within longitudinally spaced rectangular areas,
b. each area consisting of one to five bar-like indicia therein which are subject to electric scanning to determine numerical values of the geometric patterns of various combinations of the indicia,
c. three of said indicia being of substantially the same length and disposed in spaced generally vertical relationship in a horizontal row,
d. the fourth and fifth indicia being of substantially the same length and spaced in generally horizontal relationship in a vertical tier,
e. certain of said five indicia being selectively usable, or usable in combination, to produce the various geometric patterns,
f. the arrangement being such that the three of said indicia may be added to represent numerical values, 1, 2 and 3, said fourth and fifth indicia each representing the numerical value, 4, the values 5, 6 and 7 being represented by one of said fourth or fifth indicia in combination with one or more of said three indicia, the value 8 being represented by both of said fourth and fifth indicia, the value 9 being represented by both of said fourth and fifth indicia in combination with one of said three indicia, and the value 0 being represented by both of said fourth and fifth indicia in combination with at least two of said three indicia, the combination with said patterns, comprising,
g. means for sequentially electrically scanning each of said patterns in two perpendicular directions,
h. the scans being indicative of a binary number corresponding to 0–9 and adapted for direct use in a computer.

* * * * *